United States Patent
Kono

(10) Patent No.: US 6,529,259 B1
(45) Date of Patent: Mar. 4, 2003

(54) SHEET SUPPLY DEVICE WITH QUICK REVERSE FUNCTION AND SHEET PROCESS METHOD

(75) Inventor: Yoshinobu Kono, Yamanashi-ken (JP)

(73) Assignee: Nisca Corporation, Yamanashi-ken (JP)

( * ) Notice: Subject to any disclaimer, the term of this patent is extended or adjusted under 35 U.S.C. 154(b) by 142 days.

(21) Appl. No.: 09/693,965

(22) Filed: Oct. 23, 2000

(30) Foreign Application Priority Data

Oct. 28, 1999 (JP) .............................................. 11-306984

(51) Int. Cl.[7] .......................... G03B 27/32; B65H 5/22; G03G 15/00
(52) U.S. Cl. .......................... 355/23; 355/24; 399/364; 271/3.13
(58) Field of Search ........................ 355/407, 23, 24; 271/3.13, 3.14; 399/364, 368

(56) References Cited

U.S. PATENT DOCUMENTS 5,371,580 A  * 12/1994 Kato et al. ................. 271/3.13
5,430,536 A    7/1995 Fullerton et al.

FOREIGN PATENT DOCUMENTS

JP          7-109060          4/1995

* cited by examiner

*Primary Examiner*—Russell Adams
*Assistant Examiner*—Peter B. Kim
(74) *Attorney, Agent, or Firm*—Kanesaka & Takeuchi

(57) ABSTRACT

A sheet supply device is formed of a sheet supply stacker, a supply path for guiding a sheet stacked on the sheet supply stacker, a sheet process portion situated in the supply path, and a switch-back path positioned on a downstream side of the sheet process portion. The switch-back path guides the sheet which has passed through the sheet process portion again to the supply path by switching back the sheet. The sheet having passed through the sheet process portion is ejected onto a sheet ejecting stacker. After a first supply of the sheet to the sheet process portion is made, the sheet is reversed by the switch-back path to make a second supply to the sheet process portion; the sheet having been subjected to the second supply is again reversed by the switch-back path to make a third supply to the sheet process portion, and then ejected onto the sheet ejecting stacker. A first supply of a next sheet to the sheet process portion is made between the second and third supplies of the preceding sheet.

15 Claims, 13 Drawing Sheets

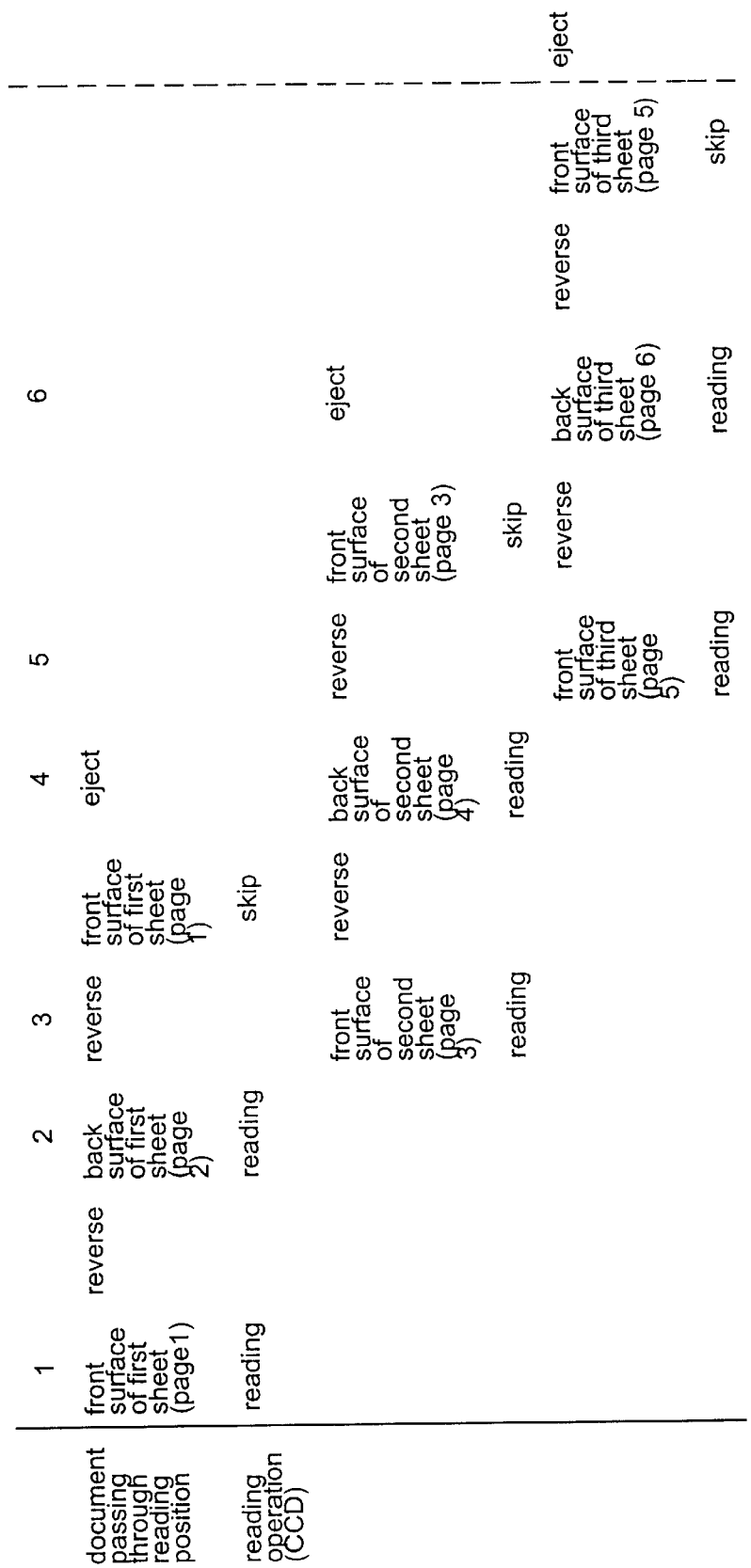

SHEET SUPPLY DEVICE WITH QUICK REVERSE FUNCTION AND SHEET PROCESS METHOD

BACKGROUND OF THE INVENTION AND RELATED ART STATEMENT

The present invention relates to a sheet supply device to be used for an apparatus for forming images on a sheet, such as an electronic copier, more particularly, a sheet supply device capable of processing one surface and both surfaces of the sheet, and a sheet process method for performing reading and writing with respect to the sheet supplied to a sheet process portion.

In an image forming apparatus, such as the electronic copier as mentioned above, there has been used a document supply device wherein a plurality of sheets (hereinafter referred to as "documents" since information is noted thereon) is fed one by one so that they are automatically fed to a position where contents of the document can be read, what is called, an auto document feeder (hereinafter referred to as "ADF"). Recently, in such a document supply device, a document having information on not only one surface but also both surfaces thereof can be processed.

As a document supply device capable of processing both or two surfaces as well as one surface, for example, there has been disclosed Japanese Patent Publication (KOKAI) No. 7-175279 (prior art 1). In the document supply device disclosed in the above Japanese patent publication, when one surface processing is carried out, documents are stacked on a sheet supply stacker in order from a top thereof, i.e. the top document is the first page, second document is the second page, third document is the third page . . . ; and the documents are fed from the top in this order so that the documents can be supplied to a document reading portion through a supply path in a U-character shape, respectively. Since the documents read at the document reading portion are sequentially ejected as they are to a sheet ejecting stacker through a continuous route in the order of the first page, second page, third page . . . from the bottom, there is no necessity for re-arranging the ejected documents.

Also, the document supply device is provided with a switch-back path in the middle of a sheet ejecting route, and in case two surface processing is carried out, the document, one surface of which has been processed, is again guided to the supply path. However, in case the documents, the two surfaces of which have been processed, are ejected onto the sheet ejecting stacker as they are, the ejected documents have to be re-arranged. Assuming that the first document is G1, the second document is G2, the third document is G3, . . . , when page number assigned to the respective documents thus defined is expressed with a hyphen, i.e. G1-1 is a first page (front surface) of the first document, G1-2 is a second page (back surface) of the first document, G2-3 is a third page (front surface) of the second document, G2-4 is a fourth page (back surface) of the second document, and so on.

As described above, when the documents, the both surfaces of which have been processed, are ejected to the sheet ejecting stacker as they are, the page number of the documents stacked on the sheet ejecting stacker becomes G1-2, G1-1, G2-4, G2-3, . . . in this order from the bottom, so that the documents, the both surfaces of which have been processed, have to be re-arranged to be G1-1, G1-2, G2-3, G2-4 . . . . Thus, in the processing method (document supply method) disclosed in the above Japanese Patent Publication, a process step of (reading of G1-1)→(reverse of G1-1) (reading of G1-2)→(reverse of G1-2)→(skip of G1-1)→(ejection of document G1) is carried out, and the same processing step is repeated regarding the respective second, third, . . . documents. Incidentally, the "skip" as mentioned above means that reading of the document is not carried out.

According to the processes, in the two surface process mode, since the document, the both surfaces of which have been processed, is finally reversed, the documents are stacked on the sheet ejecting stacker to be G1-1, G1-2, G2-3, G2-4, . . . in this order from the bottom, so that the documents after completion of the process need not be re-arranged.

Also, in Japanese Patent Publication (KOKAI) No. 7-109060 (prior art 2), there is disclosed a document supply device having a processing method different from the two surface process method as mentioned above. In the document supply device, as in the above prior art 1, documents stacked on a sheet supply stacker are fed in order from a top thereof. However, before a process of the first document is completed, a next document is fed. In other words, when an explanation is given by using the above definition as it is: reading of a surface of document G1 (reading of G1-1)→reverse of the document G1 (reverse of G1-1) and, at the same time, supply of a document G2 and reading of a surface (reading of G2-3)→reading of a back surface of the document G1 (reading of G1-2) and, at the same time, reverse of the document G2 (reverse of G2-3)→supply of a document G3 and reading of a surface (reading of G3-5)→reading of back surface of document G2 (reading of G2-4) and, at the same time, reverse of the document G3 (reverse of G3-5)→supply of a document G4 and reading of a surface (reading of G4-7) . . . , are carried out. That is, when the preceding document, surface of which has been read, is reversed, the next document is supplied to read. According to the document supply method as described above, in the two surface process mode, the process speed can be improved.

According to the prior art 1, in the two surface process mode, there is no necessity for re-arranging the documents ejected on the sheet ejecting stacker, and paths for feeding the documents are simple so that the structure becomes compact. However, after reading of information on a back surface side is completed, the document is again reversed to skip and eject, and thereafter, a next document is supplied. Thus, a process speed in the two surface process mode becomes slow.

Also, according to the prior art 2, although the processing speed in the two surface process mode can be improved, since the documents ejected onto the sheet ejecting stacker are stacked to be G1-2, G1-1, G2-4, G2-3, . . . from the bottom, the ejected documents have to be re-arranged. Further, the order for reading the documents becomes: (G1-1)→(G2-3)→(G1-2)→(G3-5)→(G2-4)→(G4-7) . . . , i.e. instead of continuously reading the front surface and the back surface of one document, another document is entered between the front surface and the back surface of one document to be read, so that after a transfer or print is carried out, pages have to be re-adjusted with respect to the information read in order. As a result, a large capacity of memory is required and control thereof becomes complicated.

In view of the above problems, the present invention has been made, and an object of the invention is to provide a sheet supply device wherein when a two surface processing mode is carried out, a processing speed is shortened and at the same time there is no necessity for re-arranging the processed sheets, and a sheet process method enabling such a process.

Another object of the invention is to provide a sheet supply device wherein when the two surface processing mode is carried out, a large capacity of memory is not required and its control is simple, and a sheet process method enabling such a process.

Further objects and advantages of the invention will be apparent from the following description of the invention.

SUMMARY OF THE INVENTION

In order to attain the above objects, a sheet supply device according to the present invention includes a sheet supply stacker, a supply path for guiding a sheet stacked on the sheet supply stacker to a sheet process portion, a switch-back path positioned at a downstream side than the sheet process portion and guiding the sheet which has passed through the sheet process portion to the supply path by switching back the sheet, and a sheet ejecting stacker on which the sheet having passed through the sheet process portion is ejected to thereby constitute the device such that a front surface and a back surface of the sheet pass through the sheet process portion. After a first supply of a preceding sheet to the sheet process portion is made, the preceding sheet is reversed by the switch-back path to make a second supply to the sheet process portion, and the preceding sheet having been subjected to the second supply is again reversed by the switch-back path to make a third supply to the sheet process portion and then ejected onto the sheet ejecting stacker. A first supply of a next sheet to the sheet process portion is made between the second supply and the third supply of the preceding sheet.

Also, in order to attain the above objects, a sheet process method according to the present invention includes a first supply step for supplying a preceding sheet to a sheet process portion; a second supply step for supplying the preceding sheet subjected to a first supply to the sheet process portion in a reversed state; a first supply step for supplying a next sheet to the sheet process portion after the second supply step; and a third supply step for again supplying the preceding sheet in the reversed state to the sheet process portion after the first supply step of the next sheet.

In the structure as described above, each document to be processed is switched back to be supplied to a sheet process portion three times, and thereafter ejected, so that the pages of the ejected documents need not be re-arranged. Also, the next document is supplied between the second supply and the third supply of the preceding document, so that a process speed can be improved.

BRIEF DESCRIPTION OF THE DRAWING

FIGS. 11(a) and 11(b) are time charts showing processing steps of different documents, respectively.

DETAILED DESCRIPTION OF PREFERRED EMBODIMENTS

Hereunder, embodiments of the invention are explained with reference to the accompanying drawings. Incidentally, in the following embodiments, an automatic-document feeder (hereinafter referred to as "ADF"), to be mounted to an electronic copier as an image forming apparatus, for automatically feeding documents to a document reading position, i.e. sheet process portion, is exemplified as a sheet supply device.

Figure 1:
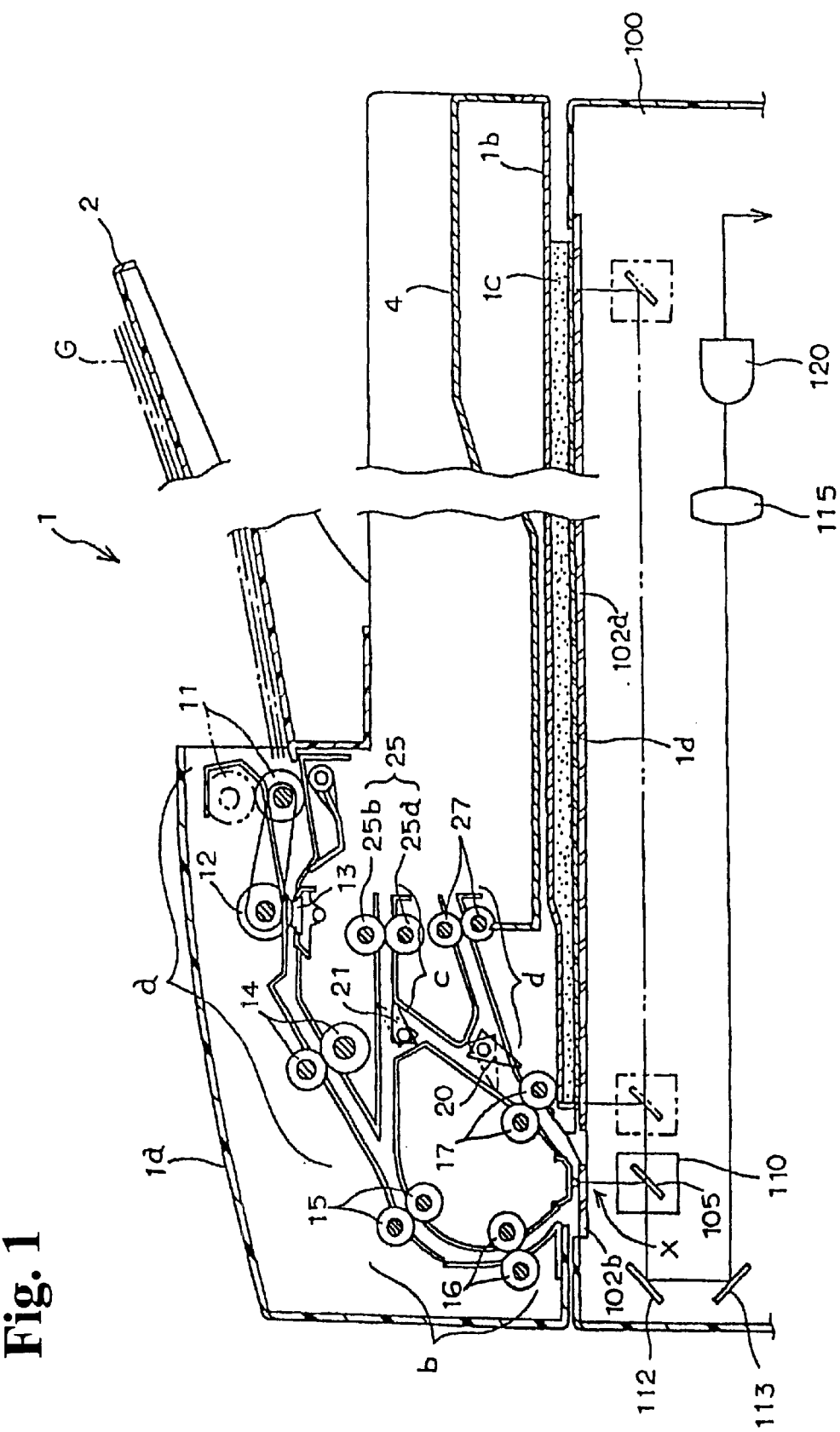
FIG. 1 is a sectional view showing an essential part of a structure of a document supply device according to the invention.
Figure 2:
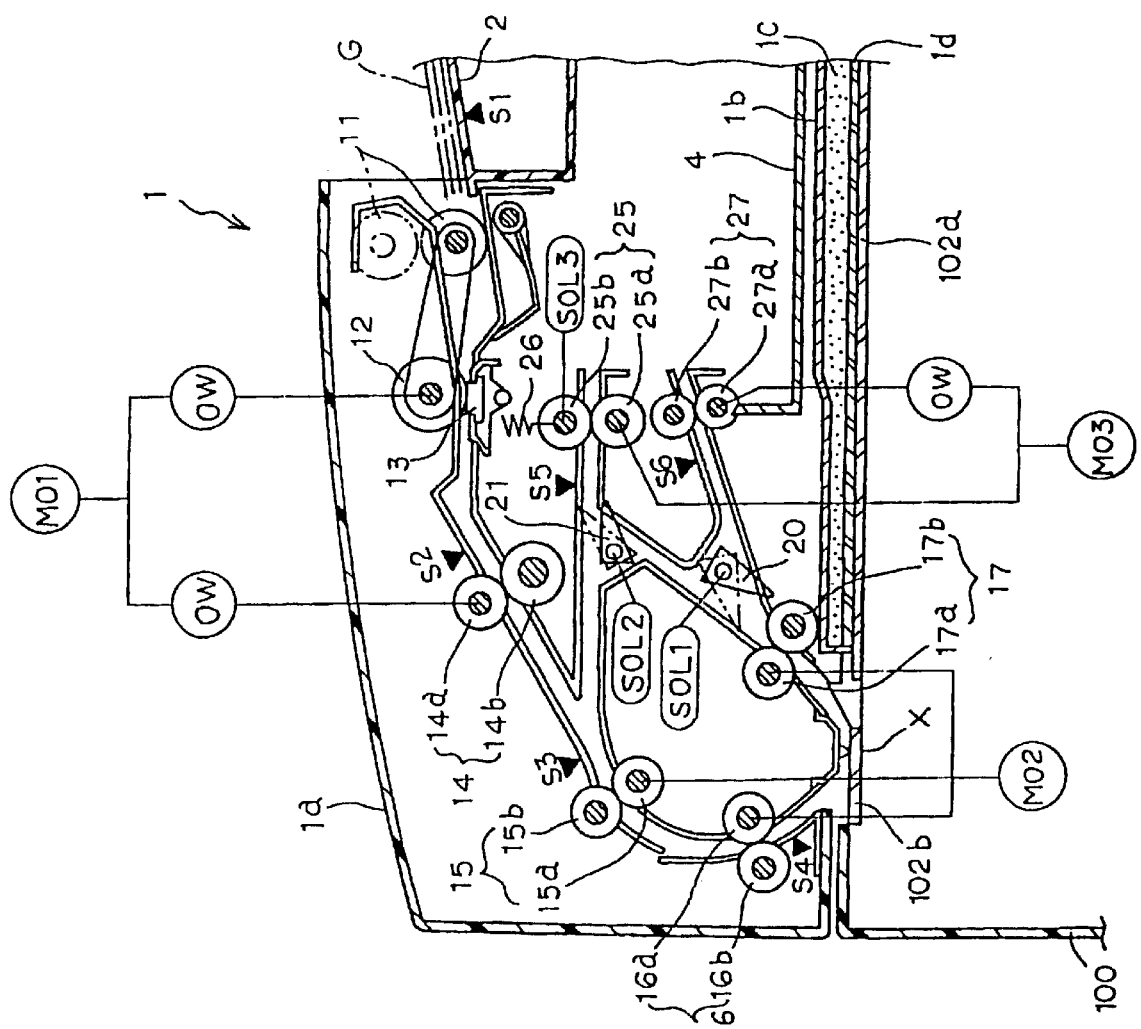
FIG. 2 is an enlarged sectional view of the document supply device as shown in FIG. 1.

FIGS. 1 and 2 are sectional views showing an inner structure of ADF1 to be mounted to an electronic copier 100, and an arrangement of control elements for controlling transfer of sheets, such as sensors and motors, respectively. A document table glass, i.e. the first platen, 102a is disposed on an upper portion of a main frame of the electronic copier 100 to process the documents one by one. A cover glass, i.e. the second platen, 102b where the documents continuously transferred by ADF1 pass through is disposed adjacent to the platen 102a.

Under the platens 102a and 102b, a scanning device for reading the documents is located. The scanning device in the present embodiment includes a traveling member 110 having a light source (not shown) for irradiating light against the document and the first mirror 105 for reflecting a reflected light from the document; the second and third mirrors 112 and 113 for reflecting the light from the first mirror 105; an optical system 115 for converging the light from these mirrors; and a charge-coupled device (hereinafter referred to as 120 for detecting the light converged by the optical system. Light information entering into the CCD 120 is then subjected to photoelectric transfer and analog/digital conversion according to a known method, and the same information as contents of the document which has been scanned at an image forming portion, not shown, is copied on a transfer sheet.

Incidentally, in a practical scanning process, in case one sheet is processed, the traveling member 110 is moved in an area of the first platen 102a as shown by a dotted line, and in case a continuous processing of plural sheets is carried out by the ADF1, the traveling member 110 is fixed under the second platen 102b. Also, in the present embodiment, the traveling member, as shown in the drawing, is incorporated into the electronic copier 100, but it may be incorporated into the ADF1, as a unit, beforehand.

The ADF1 is structured such that the documents are continuously transferred to a position, i.e. sheet process portion where the document is actually read. Also, the ADF1 is provided with a pressure plate for placing the document on a surface of the platen 102b in a closely attached state so that the documents can be processed one by one. The pressure plate is formed of a supporting plate 1b made of a hard resin for constituting a bottom surface of a housing 1a of the ADF1, an elastically deformable thick porous layer 1c laminated on a lower surface of the supporting plate 1b, and a soft surface layer 1d for covering the porous layer 1c.

In the housing 1a, there are provided in parallel, in a vertical direction, a sheet supply stacker 2 for stacking thereon a plurality of documents G, and a sheet ejecting stacker 4 for ejecting the documents which have been fed from the sheet supply stacker 2 and read at the sheet process portion X. Incidentally, in the present embodiment, the documents on the sheet supply stacker are placed such that the surfaces to be processed face upwardly and are stacked downwardly from document G1, document G2, document G3, . . . in order, and are supplied from the upper side of the documents in this order.

In the housing 1a, various guiding paths for guiding the document fed from the sheet supply stacker 2 are disposed. In the drawings, reference numeral a is a guiding path for guiding the document G fed from the sheet supply stacker into the device; b is a supply path formed in a U-character shape and supplying the document transferred from the guiding path a to the sheet process portion X by reversing a surface, i.e. process surface, where information is noted; c is a switch-back path for switching back the document, one surface of which has been processed, to re-supply the document to the guiding path a in case a two surface processing is carried out; and d is a sheet ejecting path for guiding the document having been processed at the sheet process portion X onto the sheet ejecting stacker 4.

At an entrance of the guiding path a, there is provided a feeding mechanism formed of kick-rollers 11 for feeding the documents stacked on the sheet supply stacker 2, a supply roller 12 and a separating member 13 for separating the documents fed by the kick-rollers 11 to be a single sheet, so that the stacked documents are separated one by on in order from the top thereof to be fed to the guiding path a. Also, in the guiding path a, there is disposed a first pair of transfer rollers 14 including a driving roller 14a and a driven roller 14b for guiding the document separated to a single sheet into the supply path b. Incidentally, the supply roller 12 and the driving roller 14a are rotated in only one direction through one way clutch OW for transmitting only one way rotation by a reversibly rotatable driving motor MO1.

The supply path b is formed in a U-character shape as shown in the drawing, and provided with a second pair of transfer rollers 15 and a third pair of transfer rollers 16 adjacent to each other to supply the document to the sheet process portion X. Also, on a downstream side of the sheet process portion X, there is disposed a fourth pair of transfer rollers 17 for transferring the processed document to the switch-back path c or the sheet ejecting path d, which are described later. These roller pairs 15, 16, 17 are formed of driving rollers 15a, 16a, 17a and driven rollers 15b, 16b, 17b, respectively, and the respective driving rollers 15a, 16a, 17a are rotated by the driving motor MO2.

On the downstream side of the fourth pair of transfer rollers 17, there are disposed a switching member 20 for distributing the transferred documents to the switch-back path c or ejecting path d; and a guiding member 21 for guiding the document to the switch-back path c and, at the same time, guiding the switched-back document to the supply path a. Both the switching member 20 and guiding member 21 are rotatably held. Incidentally, these members 20 and 21 are urged to positions shown by solid lines by elastic members, not shown, and properly rotated through excitations of electromagnetic solenoids SOL1 and SOL2, respectively.

In the switch-back path c, there is provided a pair of switch-back rollers 25 including a reversibly rotatable roller 25a driven by a reversibly rotatable driving motor MO3 and a driven roller 25b pressed against an outer circumference of the reversibly rotatable roller 25a by a pressure welding spring 26. Also, the driven roller 25b is engaged with an electromagnetic solenoid SOL3 and can be separated from the reversibly rotatable roller 25a by the excitation of the electromagnetic solenoid SOL3. In other words, transfer of the document to be guided into the switch-back path c can be controlled by the excitation of the electromagnetic solenoid SOL3 and normal rotation/reverse rotation of the reversibly rotatable roller 25a.

In the sheet ejecting path d, there is disposed a pair of sheet ejecting rollers 27 formed of a driving roller 27a and a driven roller 27b, and the driving roller 27a is rotated in only a sheet ejecting direction through the driving motor MO3 and the one way clutch OW for transmitting rotation only in one direction.

Figure 3:
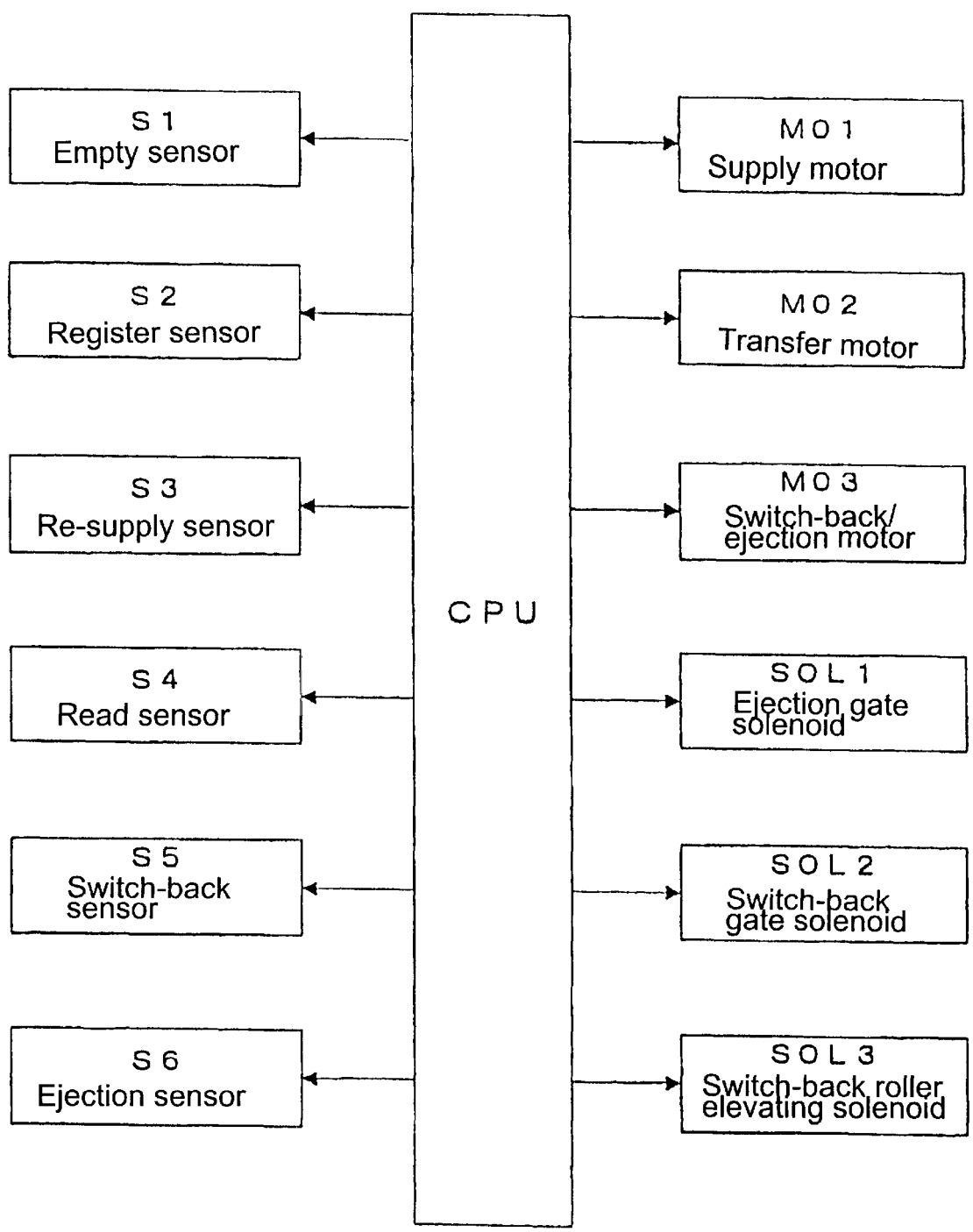
FIG. 3 is a block diagram of a system for controlling transfer of a document of the document supply device as shown in FIG. 1.

The above sheet supply stacker 2 is provided with a sensor S1 for detecting presence of the sheet, and the guiding path a, supply path b, switch-back path c and sheet ejecting path d are provided with sensors S2 to S6 for detecting passage of the sheet, respectively. The respective sensors S1 to S6, as shown in FIG. 3, are connected to a controlling device or CPU for controlling driving of the entire device, and the above-stated respective motors MO1 to MO3 and respective solenoids SOL1 to SOL3 are driven based on the detected signals from the respective sensors.

The ADF1 having the structure as explained above, as will be described in detail hereunder, can transfer such that the documents on the sheet supply stacker 2 are fed corresponding to the one surface reading mode and two surface reading mode of the document, i.e. one surface processing mode and two surface processing mode. However, the ADF may be structured to carry out only the two surface process. Also, in case the ADF is structured to carry out the one surface process and both surface process, it is possible to set the respective processing modes through an ADF main portion and scanning device, or outer signals, such as input signals from a personal computer.

Next, in the ADF1 having the structure capable of processing one surface and two surfaces as described above, when the one surface process and the two surface process are practically carried out, excitations of the respective solenoids, drivings of the respective driving rollers and transfer states of the document are explained.

One Surface Processing Mode

Documents G stacked on the sheet supply stacker 2 are fed to the guiding path a one by one through driving of the motor MO1 to rotate the kick rollers 11 and the supply roller 12 (at this time, the first pair of transfer rollers 14 is not rotated by the action of the one way clutch). Then, when a leading edge of the transferred document G is detected by the sensor S2, after the lapse of a predetermined time, the motor is reversely driven. Before the lapse of the predetermined time, since the motor MO1 is continuously driven in the sheet feeding direction, the leading edge of the document abuts against a nipping portion of the first pair of transfer rollers 14 to form a bent portion, so that a skew correction is carried out. After the lapse of the predetermined time, although the motor MO1 is reversely driven, the driving is not transmitted to the kick rollers 11 and supply roller 12 by the action of the one way clutch, and the document is fed toward the supply path b through driving of the first pair of transfer rollers 14. Incidentally, the driving of the first pair of transfer rollers 14 is stopped by setting a timer after the lapse of a predetermined time since start of the driving.

Also, after the lapse of a predetermined time since the leading edge of the document is detected by the sensor S2 by setting a timer, the motors MO2 and MO3 are driven, so that the second pair of transfer rollers 15, the third pair of transfer rollers 16, the fourth pair of transfer rollers 17, the pair of sheet ejecting rollers 27 and the pair of switch-back rollers 25 are rotated. At this time, the document is reversed by the supply path b in the U-character shape, so that the document passes through the sheet process portion X while allowing the surface to be processed to face the sheet process portion X. Incidentally, when the sensor S4 detects the leading edge of the document, the driving of the motor MO2 (i.e. the second pair of transfer rollers 15, the third pair of transfer rollers 16 and the fourth pair of transfer rollers 17) is temporarily stopped, and when the motor MO2 is re-started, the surface to be processed of the document is subjected to a secondary scan by the scanning device as described above to be read.

In case of the one surface processing mode, when the electromagnetic solenoid SOL1 is excited, the switching member 20 is rotated to a position as shown by dotted lines from its initial position, so that the document, one surface of which has been processed, is guided to the sheet ejecting path d and ejected onto the sheet ejecting stacker 4 through a pair of the sheet ejecting rollers 27 under a driving condition. Incidentally, feeding of the next document, i.e. re-driving of the motor MO1, is carried out, for example, when the sensor S6 detects the leading edge of the preceding document, process of which has been done.

When all the documents are fed, the sensor S1 detects no document on the sheet supply stacker 2, and a rear edge of the last processed document is detected by the sensor S6, drivings of the above-stated respective pairs of rollers are stopped, and excitation of the solenoid SOL1 is released. In this case, since processed surfaces of the documents which have been ejected onto the sheet ejecting stacker face downwards, there is no necessity for re-arranging the documents.

Two Surface Processing Mode

In addition to FIGS. 1 and 2, with reference to FIGS. 4(a)–4(c)–FIGS. 10(a) and 10(b) showing states where the document is transferred, the two surface processing mode is explained. Incidentally, three documents (G1–G3) are continuously transferred, and the respective documents which were defined in the above prior art section are employed as they are.

Figure 4A:
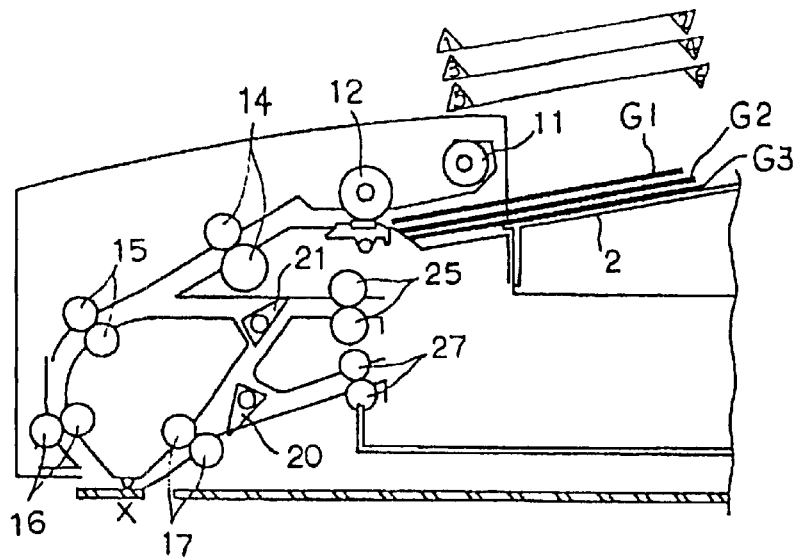
FIGS. 4(a)–4(c) are diagrams showing continuous transferring states of the document when a two surface processing mode is carried out in the document supply device as shown in FIG. 1.
Figure 4B:
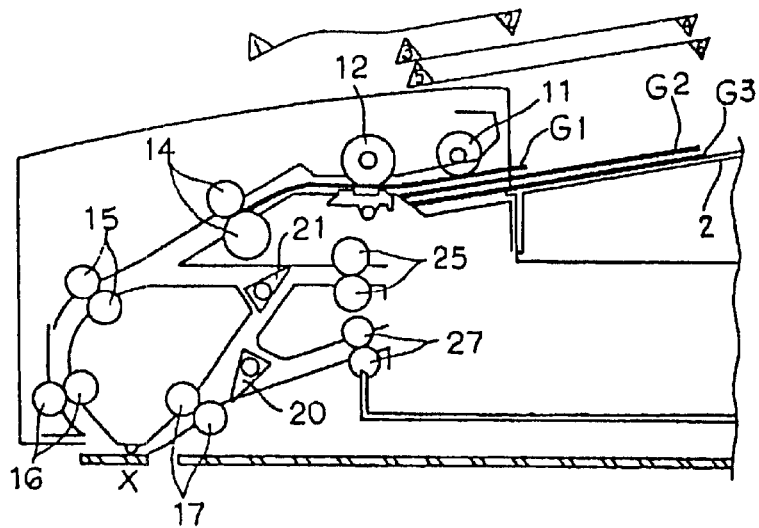
Figure 4C:
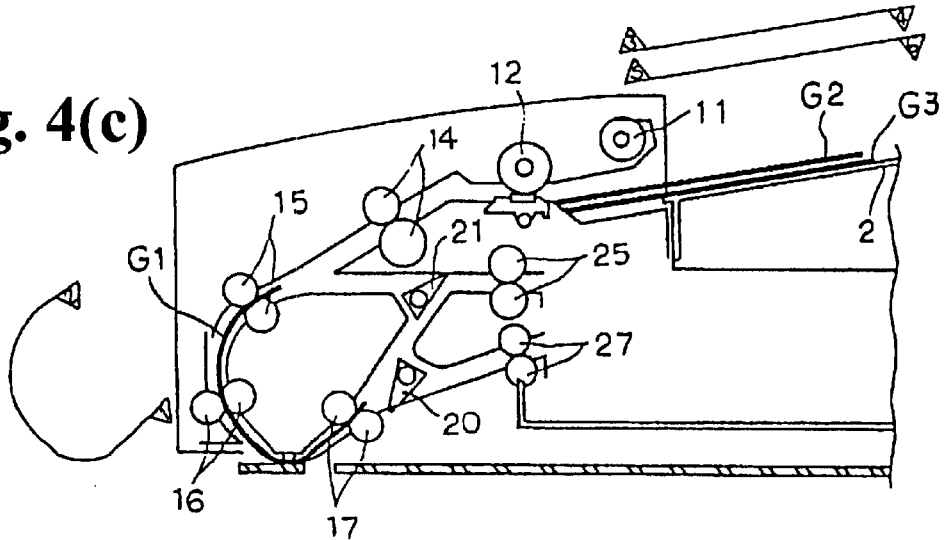

(1) In case of the two surface processing mode, the switching member 20 is located at an initial position as shown by the solid lines, and the guiding member 21 is rotated from the initial position to a position as shown by the dotted lines through excitation of the electromagnetic solenoid SOL2 (refer to FIG. 2). Under the state, after the first (preceding) document G1 is released from its skewed state as in the one surface process mode, as shown in FIGS. 4(a) to 4(c), the first page (G1-1) is supplied to the sheet process portion X (first supply) to be read by the scanning device.

Figure 5A:
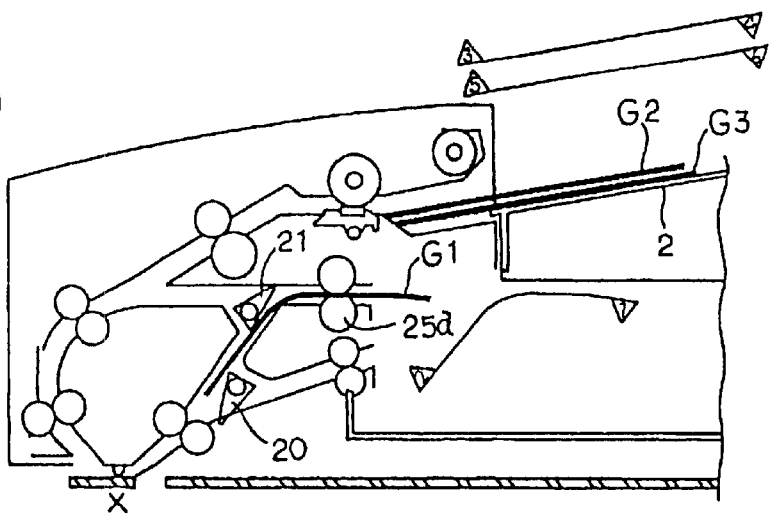
FIGS. 5(a)–5(c) are diagrams showing subsequent states of the transferring states of the document as shown in FIGS. 4(a)–4(c)
Figure 5B:
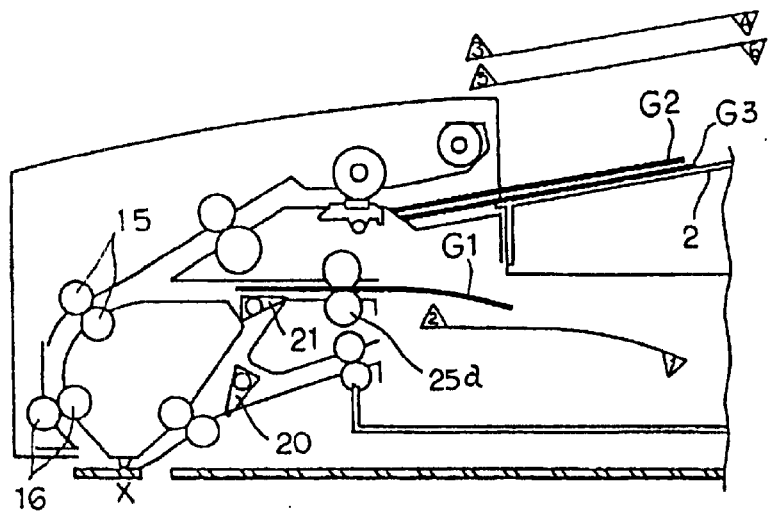

(2) The document G1 is guided into the switch-back path c through the switching member 20 and the guiding member 21 under the above-stated conditions (refer to FIG. 5(a)). At this time, although the reversibly rotatable roller 25a is rotated clockwise (normal rotation) and the leading edge side of the document G1 is projected outside from the switch-back path c, when the sensor S5 detects the rear edge of the document G1, the motor MO3 is reversely rotated, so that the reversibly rotatable roller 25a is rotated reversely and the document G1 is switched back toward the supply path b. Incidentally, based on the above detection by the sensor S5, the excitation of the solenoid SOL2 is released and the guiding member 21 is rotated to a position as shown by the solid lines (refer to FIG. 5(b)).

Figure 5C:
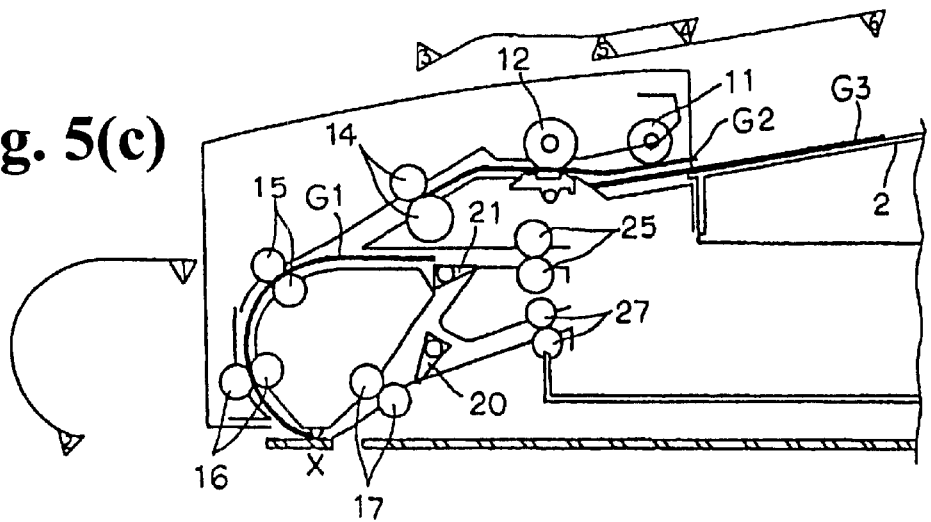
Figure 6A:
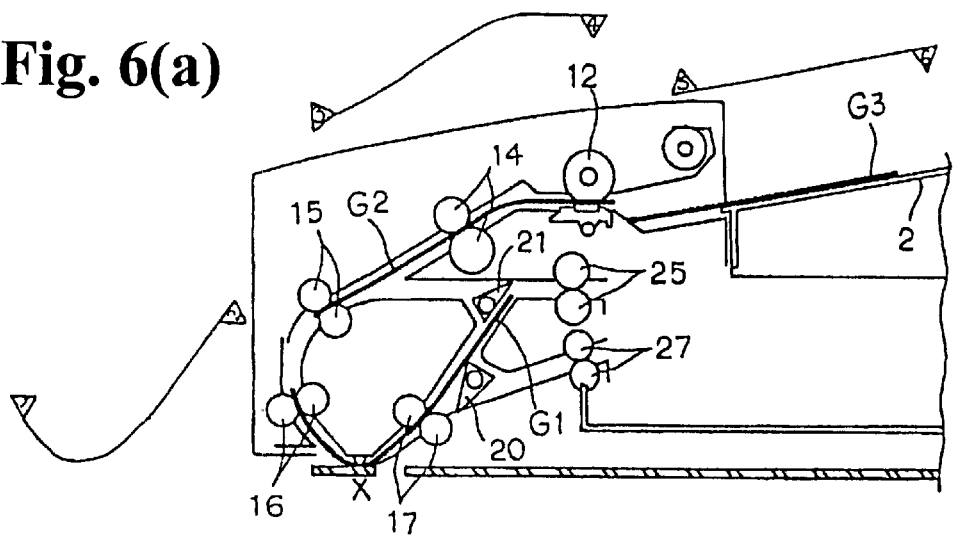
FIGS. 6(a)–6(c) are diagrams showing subsequent states of the transferring states of the document as shown in FIGS. 5(a)–5(c)

(3) Then, when the leading edge of the switched-back document is detected by the sensor S3, the next document G2 starts to be supplied (refer to FIG. 5(c)). Then, when the leading edge of the switched-back document G1 is detected by the sensor S4, drivings of the second pair of transfer rollers 15, the third pair of transfer rollers 16 and the fourth pair of transfer rollers 17 are temporarily stopped. When these rollers are re-driven, the document G1 is supplied to the sheet process portion X (second supply) and the second page (G1-2) thereof is read by the scanning device (refer to FIG. 5(c) and FIG. 6(a)). Incidentally, when the leading edge of the switched-back document G1 is detected by the sensor S4, the solenoid SOL 2 is excited, so that the guiding member 21 is rotated to a position as shown by the dotted lines, the motor MO3 is subjected to the normal rotation and the reversibly rotatable roller 25a is again rotated normally.

Figure 6B:
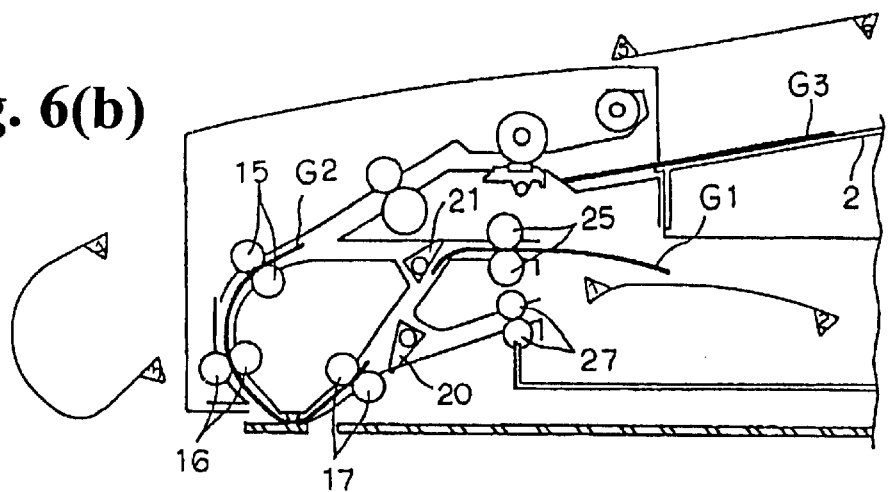

(4) The document G1, the second page of which has been read, is guided again into the switch-back path c; the next document G2 is supplied to the sheet process portion X (the first supply of the next document); and the third page (G2-3) is read (refer to FIG. 6(b)). Together with the reading action, although the leading edge side of the document G1 is projected to the outside from the switch-back path c, when the sensor S5 detects the rear edge of the document G1, the reversibly rotatable roller 25a is reversely rotated through the reversed rotation of the motor MO3, and at the same time, the excitation of the solenoid SOL2 is released to thereby rotate the guiding member 21 to the position as shown by the solid lines, so that the document G1 is again switched back toward the supply path b.

Figure 6C:
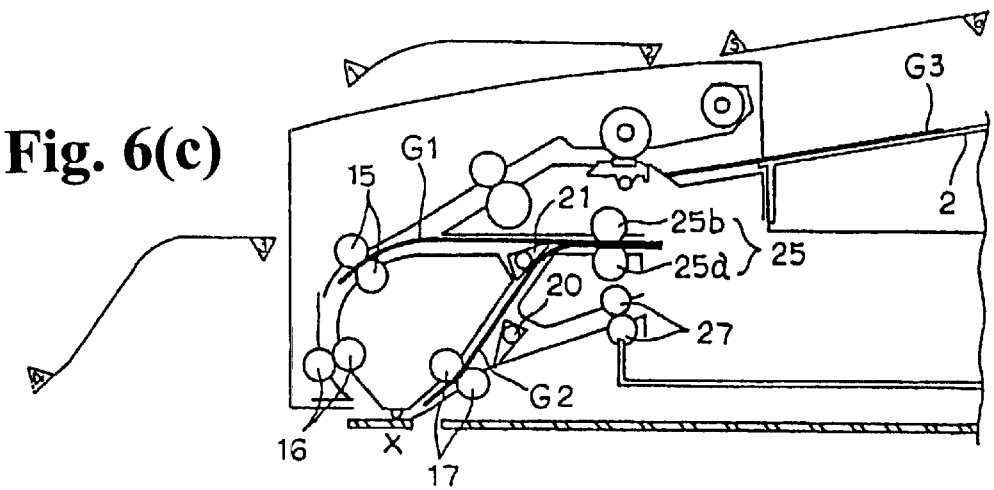

(5) Incidentally, in this step, as shown in FIG. 6(c), it is preferable to control such that the preceding switched-back document G1 and the next document G2 partially overlap in the switch-back path c. More specifically, when the leading edge of the re-switched-back document G1 is detected by the sensor S3 and held by the second pair of transfer rollers 15, the solenoid SOL3 is excited and the driven roller 25b is separated from the reversibly rotatable roller 25a to thereby guide the leading edge side of the next document G2 into the switch-back path c. In this case, by positioning the guiding member 21 in a half-rotated state through adjustment of the excitation of the solenoid SOL2 and by interposing a spring, not shown, between the guiding member 21 and the solenoid SOL2 through the feeding action of the pair of transfer rollers 17, the leading edge side of the document G2 can pass through the guiding member 21 (refer to FIG. 6(c)). Then, after lapse of a predetermined time since the sensor S3 detects the leading edge of the re-switched-back document G1, in other words, when the rear edge of the re-switched-back document G1 is separated from the driven roller 25b, the excitation of the solenoid SOL3 is released, so that the driven roller 25b abuts against the reversibly rotatable roller 25a and, at the same time, the document G2 is guided into the switch-back path c through normal rotation of the motor MO3.

Figure 7A:
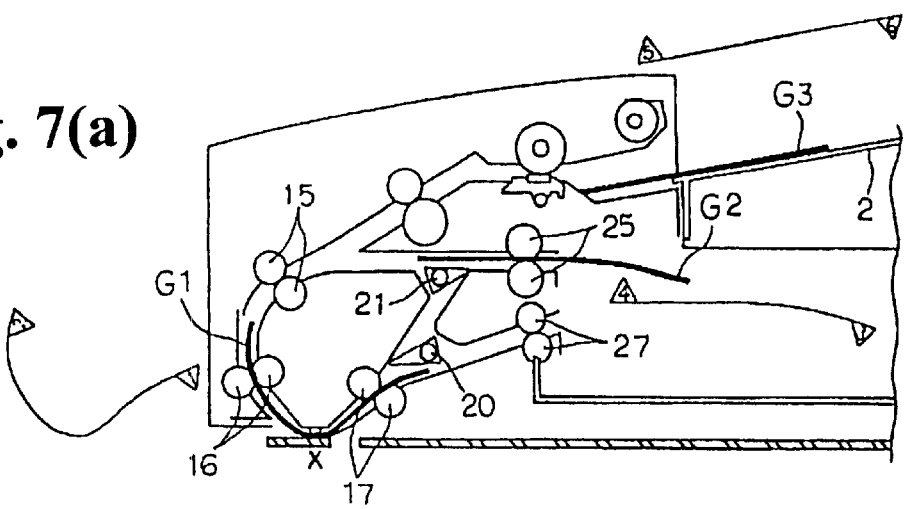
FIGS. 7(a)–7(c) are diagrams showing subsequent states of the transferring states of the document as shown in FIGS. 6(a)–6(c)
Figure 7B:
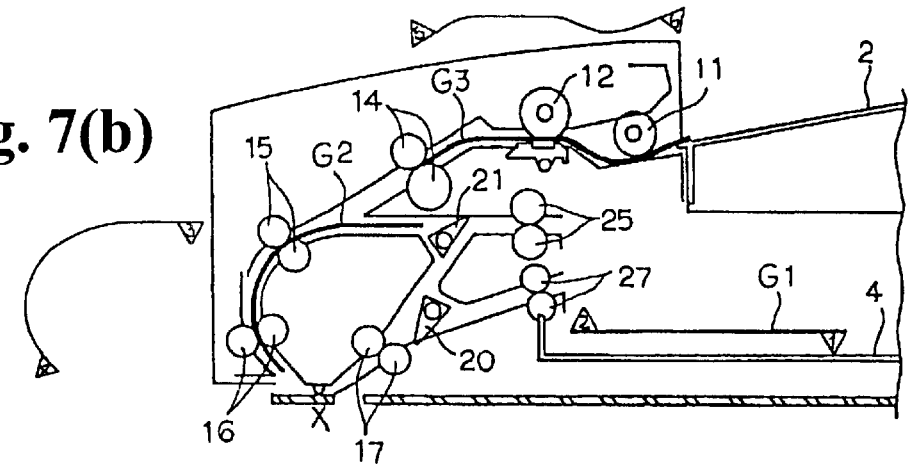

(6) Then, when the sensor S5 detects the rear edge of the document G2, the motor MO3 is reversely rotated to thereby reversely rotate the reversibly rotatable roller 25a and, at the same time, the excitation of the solenoid SOL2 is released to thereby rotate the guiding member 21 to the position as shown by the solid lines, so that the document G2 is switched back to the supply path b (refer FIG. 7(a)). Incidentally, when the rear edge of the switched-back document G2 is detected by the sensor S5, the motor MO3 is normally rotated. At this time, the preceding re-switched-back document G1 is positioned at the supply path b, and when the sensor S4 detects the leading edge thereof, the solenoid SOL1 is excited, and the switching member 20 is rotated to the position as shown by the dotted lines. Although the first page (G1-1) of the document G1 is supplied to the sheet process portion X (third supply), at this time, reading of the first page by the scanning device is not carried out (skip). Then, the document G1 is guided into the sheet ejecting path d as it is, and is ejected onto the sheet ejecting stacker 4 through the pair of normally rotating sheet ejecting rollers 27 with the first page (G1-1) facing downwards (refer to FIGS. 7(a) and 7(b)). Incidentally, when the sensor S6 detects the rear edge of the document G1, the excitation of the solenoid SOL1 is released, the switching member 20 is returned to the state as shown by the solid lines.

Figure 7C:
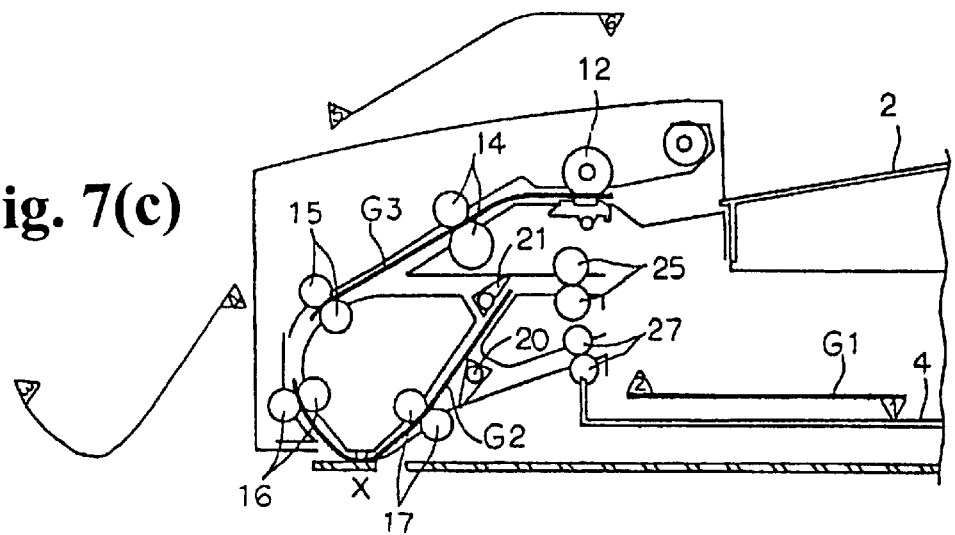

(7) When the preceding document G1 is in the ejected state, the document G2 is switched back and is positioned in the supply path b. When the document G2 is directed to the supply path b and the leading edge thereof is detected by the sensor S3, supply of the next document G3 starts (refer to FIG. 7(b)). Then, when the leading edge of the switched-back document G2 is detected by the sensor S4, drivings of the second pair of transfer rollers 15, the third pair of transfer rollers 16 and the fourth pair of transfer rollers 17 are temporarily stopped. Through re-drivings of these rollers, the fourth page (G2-4) of the document G2 supplied to the sheet process portion X (second supply) is read by the scanning device (refer to FIG. 7(c)). Also, when the leading edge of the switched-back document G2 is detected by the sensor S4, the solenoid SOL2 is excited to thereby rotate the guiding member 21 to the position as shown by the dotted lines.

Figure 8A:
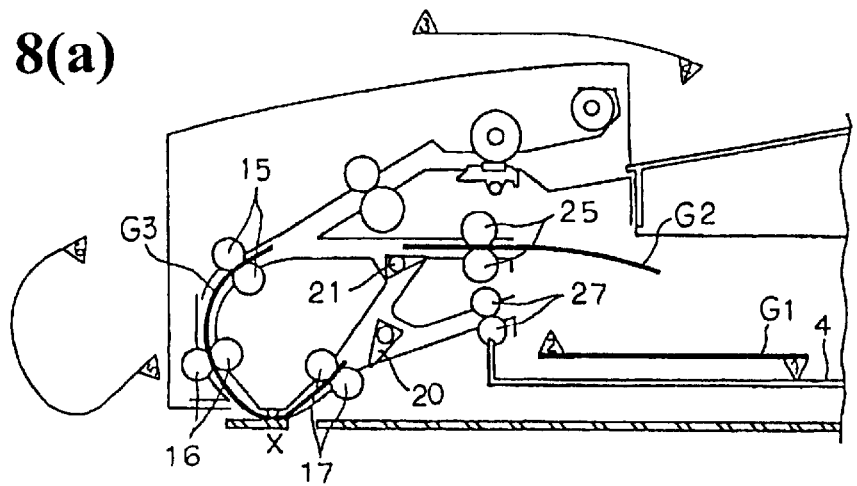
FIGS. 8(a)–8(c) are diagrams showing subsequent states of the transferring states of the document as shown in FIGS. 7(a)–7(c)

(8) The document G2, the forth page of which has been read, is again guided into the switch-back path c and, at the same time, the next document G3 is supplied to the sheet process portion X (first supply of the next document with respect to the document G2), and reading of the fifth page (G3-5) is carried out (refer to FIG. 8(a)). Together with the reading operation, although the leading edge side of the document G2 is projected to the outside from the switch-back path c, when the sensor S5 detects the rear edge of the document G2, the motor MO3 is reversely rotated to thereby rotate the reversibly rotatable roller 25a in the reverse direction and the excitation of the solenoid SOL2 is released to rotate the guiding member 21 to the position as shown by the solid lines, so that the document G2 is re-switched back toward the supply path b.

Figure 8B:
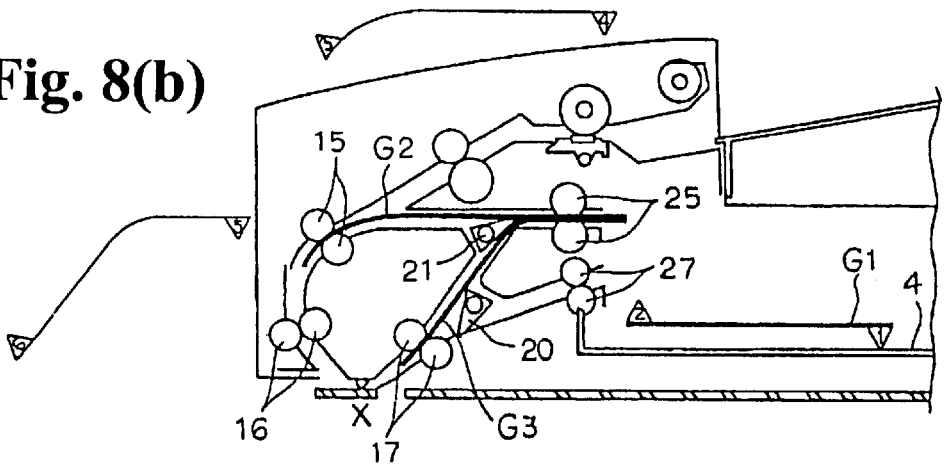

(9) Incidentally, in this step, also, as shown in FIG. 8(b), the preceding switched-back document G2 and the next document G3 partially overlap in the switch-back path c, as in the above-explained step (5). Then, after the lapse of a predetermined time since the sensor S3 detects the leading edge of the re-switched-back document G2, in other words, when the rear edge of the re-switched-back document G2 is separated from the driven roller 25b, the excitation of the solenoid SOL3 is released to allow the driven roller 25b to abut against the reversibly rotatable roller 25a and, at the same time, the motor MO3 is normally driven to guide the document G3 into the switch-back path c.

Figure 8C:
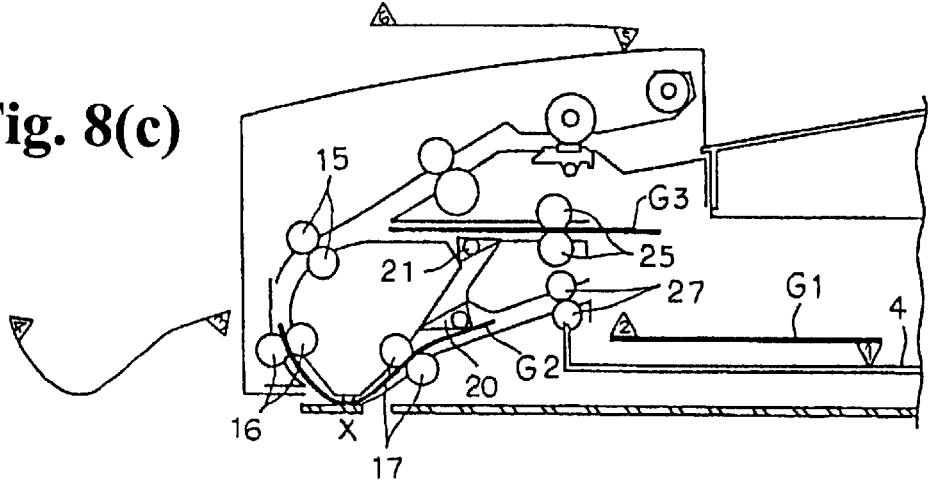
Figure 9A:
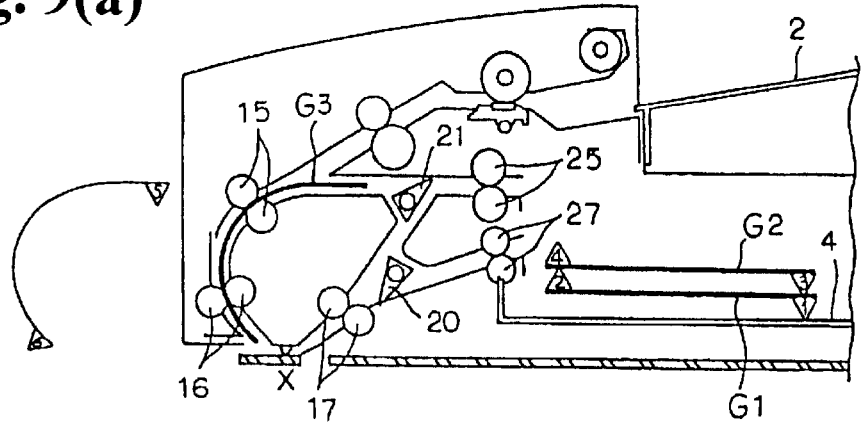
FIGS. 9(a)–9(c) are diagrams showing subsequent states of the transferring states of the document as shown in FIGS. 8(a)–8(c)

(10) When the sensor S5 detects the rear edge of the document G3, the motor MO3 is reversely rotated to thereby reversely rotate the reversibly rotatable roller 25a and the excitation of the solenoid SOL2 is released to rotate the guide member 21 to the position as shown by the solid lines, so that the document G3 is switched back to the supply path b (refer to FIG. 8(c)). Incidentally, when the sensor S5 detects the rear edge of the switched-back document G3, the motor MO3 is normally rotated. Also, at this time, the preceding re-switched-back document G2 is positioned in the supply path b, and when the sensor S4 detects the leading edge thereof, the solenoid SOL1 is excited to rotate the switching member 20 to the position as shown by the dotted lines. Although the third page (G2-3) of the document G2 is supplied to the sheet process portion X (third supply), at this time, the reading operation by the scanning device is not carried out (skip). Then, the document G2 is guided into the sheet ejecting path d as it is, and ejected onto the sheet ejecting stacker 4 through the pair of sheet ejecting rollers 27 under the normal rotating state with the third page (G2-3) facing downwards (refer to FIG. 9(a)). Incidentally, when the sensor S6 detects the rear edge of the document G2, the excitation of the solenoid SOL1 is released and the switching member 20 is returned to the position as shown by the solid lines.

Figure 9B:
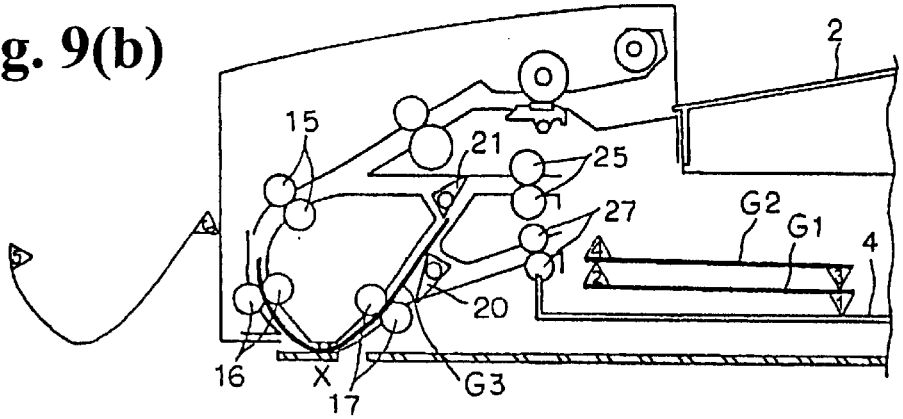

(11) When the preceding document G2 is in the ejected state, the document G3 is switched back to position in the supply path b. At this time, when the sensor S4 detects the leading edge of the switched-back document G3, drivings of the second pair of transfer rollers 15, the third pair of transfer rollers 16 and the fourth pair of transfer rollers 17 are temporarily stopped. When these transfer rollers are re-started, the sixth page (G3-6) of the document G3 supplied to the sheet process portion X (second supply) is read by the scanning device (refer to FIG. 9(b)). Also, when the sensor S4 detects the leading edge of the switched-back document G3, the solenoid SOL2 is excited to rotate the guide member 21 to the position as shown by the dotted lines.

Figure 9C:
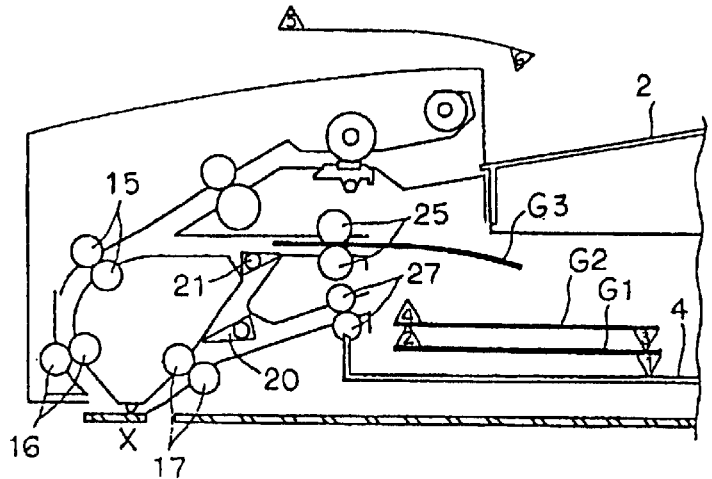

(12) Although the document G3, the second page of which has been read, is again guided into the switch-back path c and the leading edge side thereof is projected to the outside from the switch-back path c, when the sensor S5 detects the rear edge of the document G3, the motor MO3 is reversely rotated to reversely rotate the reversibly rotatable roller 25a and, at the same time, the excitation of the solenoid SOL2 is released to rotate the guide member 21 to the position as shown by the solid lines, so that the document G3 is again switched back to the supply path b (refer to FIG. 9(c)).

Then, when the sensor S4 detects the leading edge of the re-switched-back document G3, the solenoid SOL1 is excited to rotate the switching member 20 to the position as shown by the dotted lines. Although the fifth page (G3-5) of the document G3 is supplied to the sheet process portion X (third supply, refer to FIG. 10(a)), at this time, the document G3 is not read by the scanning device (skip). Then, the document G3 is guided into the sheet ejecting path d as it is, and is ejected onto the sheet ejecting stacker 4 through the pair of normally rotating sheet ejecting rollers 27 in a state that the fifth page (G3-5) thereof faces downwards (refer to FIG. 10(b)).

Figure 10A:
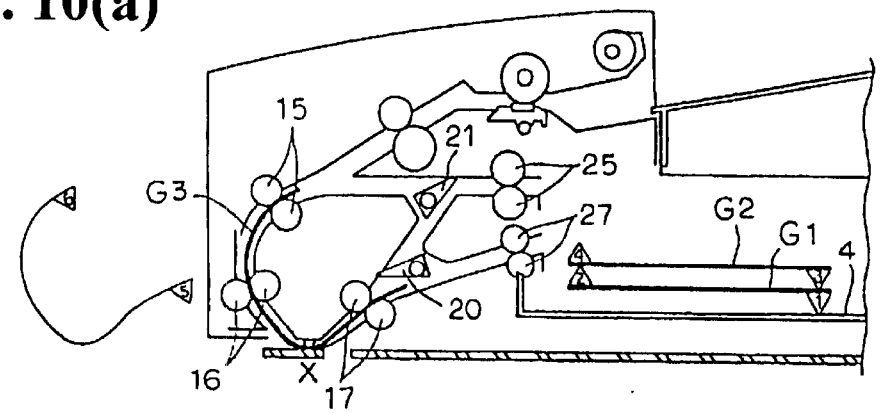
FIGS. 10(a) and 10(b) are diagrams showing subsequent states of the transferring states of the documents as shown in FIGS. 9(a) and 9(b)
Figure 10B:
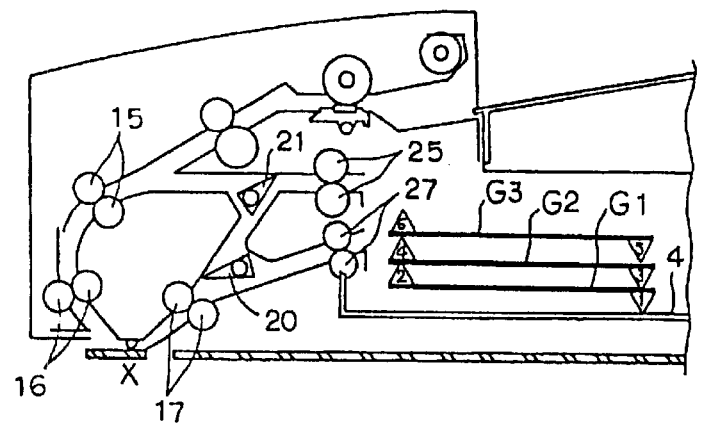

As shown in FIG. 10(b), since all the processed surfaces of the documents ejected onto the sheet ejecting stacker 4 face downwards, there is no necessity for re-arranging them.

Next, in order to intelligibly explain the operation of the two surface process mode, more specific explanation is given with reference to a time chart as shown in FIG. 11(a).

When the first document G1 passes through a reading position as the sheet process portion (first supply), a reading operation is carried out (reading of G1-1); then the document is reversed (switched back); when the document G1 again passes through the reading position (second supply), the reading operation is carried out (reading of G1-2). Then, while the document G1 is re-reversed, the next document G2 is fed, and when the document G2 passes through the reading position (first supply of the next document), the reading operation is carried out (reading of G2-3).

Thereafter, although the re-reversed document G1, both surfaces of which have been read, passes through the reading position (third supply), reading operation is not carried out (skip), and the document G1 is ejected as it is. Also, while the document G1 is being skipped and ejected, when the reversed document G2 passes through the reading position (second supply of the next document), reading operation thereof is carried out (reading of G2-4). Then, while the document G2 is re-reversed, the next document G3 is fed, and when the document G3 passes through the reading position (first supply of the next document with respect to the document G2), reading operation is carried out (reading of G3-5) . . . . Thus, through repetition of the same operations, the documents having information on both surface thereof are continuously processed.

As apparent from the above-explained processing steps, since the next document is supplied before the preceding document is ejected, more specifically, since the next document is supplied between the second supply and the third supply of the preceding document G1 to the reading position, when the two surface processing is continuously carried out, its processing speed can be improved. Also, since the documents ejected on the sheet ejecting stacker are stacked to be G1-1, G1-2, G2-3, G2-4, . . . from the bottom, after all the documents are processed, there is no necessity for re-arranging the stacked documents which have been processed. Also, in the above-explained processing steps, since reading by the scanning device is carried out for the first page, second page, third page, fourth page . . . in the page number order, information read by the scanning device can be processed as it is, so that when the transfer-printing process is carried out, its memory capacity can be small. Further, in the above-described embodiment, as shown in FIG. 6(c) and FIG. 8(b), in the switch-back path c, since the preceding document and the next document partially overlap, its process speed can be further improved.

Figure 11B:
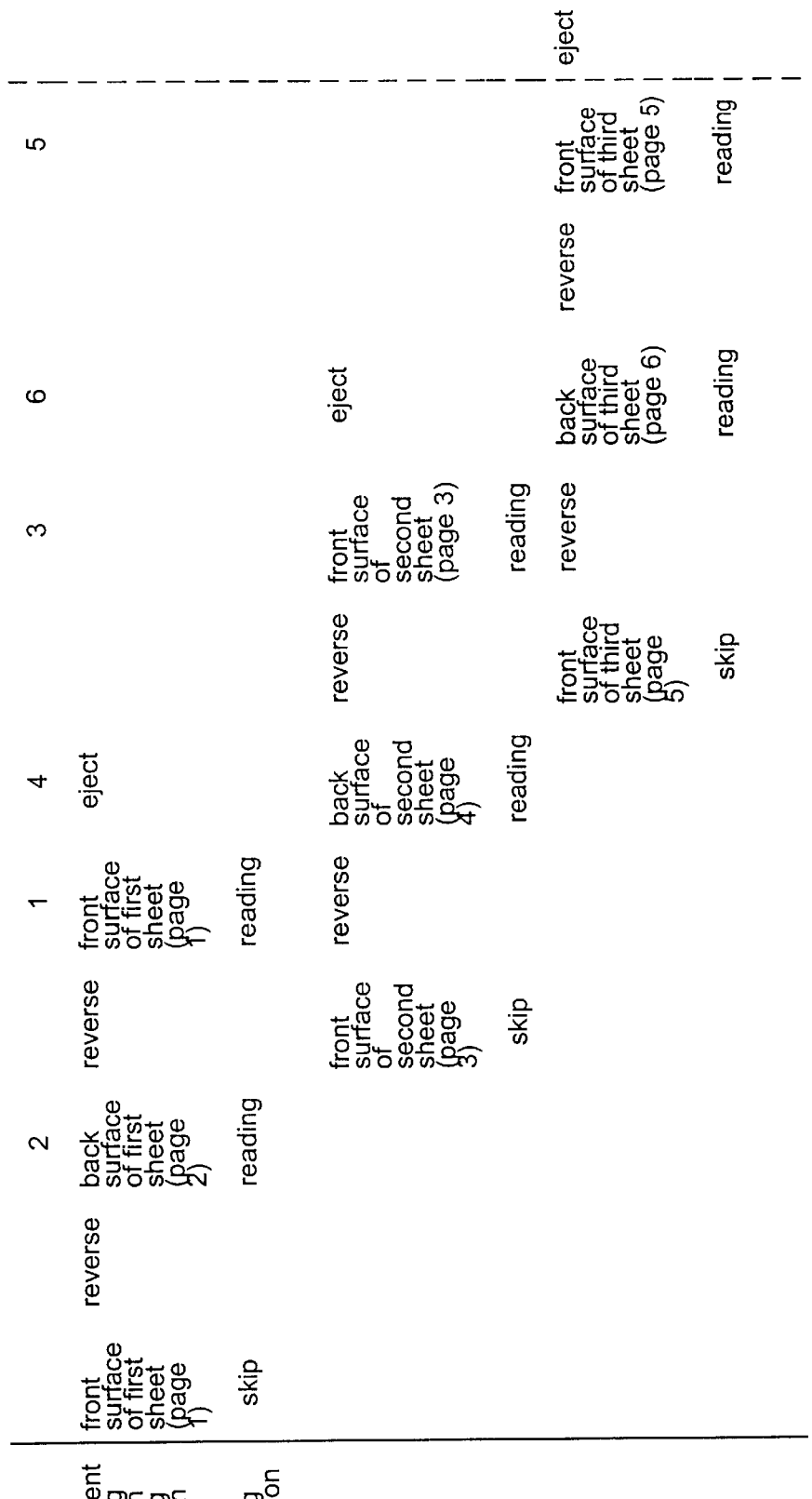

In addition to the above embodiment, the present invention can also employ a two surface processing mode according to a time chart as shown in FIG. 11(b). This processing mode and the above-described processing mode are the same in that the next document is supplied to the document reading position between the second supply and the third supply of the preceding document, but timing of the skip is different.

More specifically, when the first document G1 passes through the reading position (first supply), the reading of the document is skipped, and when the document is reversed and again passes through the reading position (second supply), the reading of the document is carried out (reading of G1-1). Then, while the document G1 is being reversed again, the next document G2 is fed, and when the document G2 passes through the reading position (first supply of the next document), reading of the next document G2 is skipped. Thereafter, when the re-reversed document G1 passes through the reading position (third supply), the document G1 is read (reading of G1-2) and ejected as it is.

Also, while the second page of the document G1 is being read and ejected, when the reversed document G2 passes through the reading position (second supply of the next document), reading thereof is carried out (reading of G2-3). Then, while the document G2 is being re-reversed, the next document G3 is fed and when the document G3 passes through the reading position (first supply of the next document with respect to the document G2), reading thereof is skipped. As described above, through repetition of the same operation, continuous processes can be carried out.

Even with the processing steps as described above, as apparent from the time charts as shown in FIGS. 11(a) and 11(b), the processing speed is the same as that of the before-mentioned processing steps.

Figure 12:
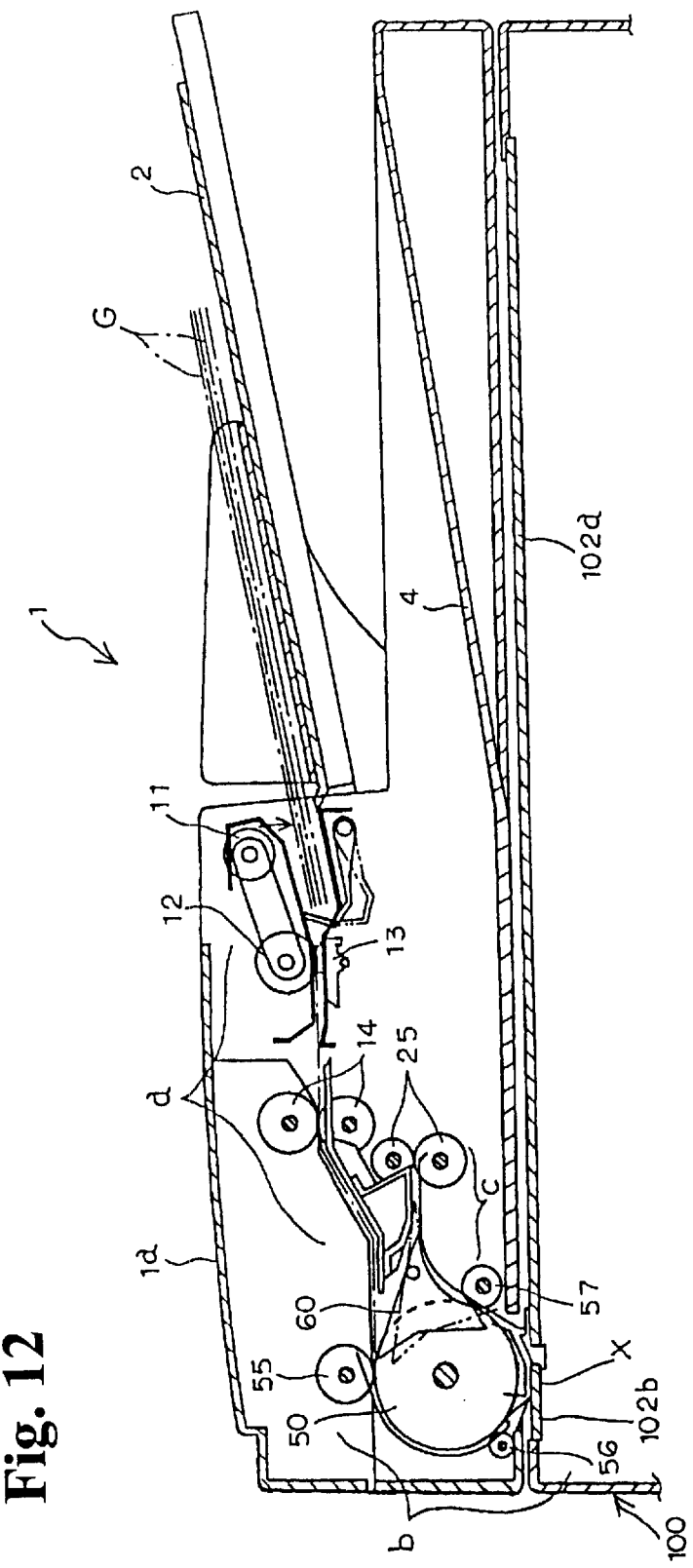
FIG. 12 is a sectional view of an essential part of a structure of another embodiment of a document supply device according to the present invention.

Next, with reference to FIG. 12, another example of the ADF is explained. Incidentally, in the drawing, members and portions having the same functions as those of the ADF as shown in FIGS. 1 and 2 are represented by the same reference symbols.

In the ADF1 of the present embodiment, a supply path b is formed of an outer circumferential surface of a large driving feed roller 50, and driven rollers 55, 56, 57 abutting against the feed roller 50, corresponding to the driven rollers 15b, 16b, 17b as shown in FIG. 2. Also, in the present embodiment, processed documents are ejected through a switch-back path c without providing the sheet ejecting path d as shown in FIG. 1. In an entrance portion of the switch-back path, there is provided a switching member 60 for guiding the document into the switch-back path c and for again guiding the switched-back document to the supply path b.

In the structure of the ADF1 as described above, also, the two surface processing of the document can be carried out according to the time charts as shown in FIGS. 11(a) and 11(b). Also, in the structure, since the supply path b is formed of the outer circumferential surface of the large driving feed roller 50 without providing the sheet ejecting path, a document transfer route in the ADF1 can be simplified, so that the entire apparatus can be miniaturized and lightened.

As described hereinabove, although the ADF to be mounted to a copier, as shown in FIGS. 1 and 12, has been exemplified with respect to a sheet supply device and sheet processing method of the present invention, the sheet supply apparatus and sheet processing method as described above may be mounted to a printer for printing on a sheet. Also, the disposed positions of the respective sensors and the driving timings of the respective solenoids and driving motors are only illustrative, and they may be varied properly.

According to the structure of the present invention, for example, in a document supply device for continuously supplying the documents to a position for reading the documents in the two surface processing mode as in a copier, the processing speed becomes short and, at the same time, there is no necessity for re-arranging the processed documents. Also, when the two surface processing mode is employed, since a front surface and a back surface of the same document are continuously read and processed, the structure does not require a large capacity memory to thereby simplify its control.

While the invention has been explained with reference to the specific embodiments of the invention, the explanation is illustrative and the invention is limited only by the appended claims.

What is claimed is:

1. A sheet supply device, comprising:

a sheet supply stacker, a supply path for guiding a sheet stacked on said sheet supply stacker, a sheet process portion situated in the supply path, a switch-back path connected to the supply path, said switch-back path receiving the sheet which has passed through said sheet process portion at a downstream side of the sheet process portion and guiding again to said supply path at an upstream side of the sheet process portion by changing a moving direction of the sheet so that a rear side of the sheet when entering the switch-back path is changed to a front side when leaving the switch-back path and entering to the supply path, and a sheet ejecting stacker on which the sheet having passed through the sheet process portion is ejected so that after a first supply of the sheet to the sheet process portion is made, the moving direction of the sheet is reversed by said switch-back path to make a second supply to the sheet process portion; the moving direction of the sheet having been subjected to the second supply is again reversed by the switch-back path to make a third supply to the sheet process portion and then ejected onto the sheet ejecting stacker; and a first supply of a next sheet to the sheet process portion is made between the second and third supplies of a preceding sheet.

2. A sheet supply device as claimed in claim 1, further comprising a sheet ejecting path for guiding the sheet to said sheet ejecting stacker, said switch-back path being disposed on a downstream side of sheet ejecting path.

3. A sheet supply device as claimed in claim 1, wherein said switch-back path is connected to the sheet ejecting stacker such that the sheet is ejected onto the sheet ejecting stacker through said switch-back path.

4. A sheet supply device as claimed in claim 1, wherein said supply path has a length such that when the preceding sheet subjected to the second supply is switched back, the preceding sheet and the next sheet partially overlap in the switch-back path.

5. A sheet supply device as claimed in claim 1, further comprising a scanning device for reading contents of the sheet to be supplied at the sheet process portion.

6. A sheet supply device as claimed in claim 5, further comprising a control device such that said scanning device reads the preceding sheet at the first and second supplies at the sheet process portion; when a first supply of the next sheet to the sheet process portion is made, the next sheet is read; and when the third supply of the preceding sheet to the sheet process portion is made, reading by the scanning device is not carried out.

7. A sheet supply device as claimed in claim 5, further comprising a control device such that said scanning device does not read the preceding sheet at the sheet process portion when the first supply thereof is carried out; the scanning device reads the preceding sheet when the second and third supplies thereof to the sheet process portion are carried out; and the scanning device does not read the next sheet when the first supply thereof to the sheet process portion is carried out.

8. A sheet supply device as claimed in claim 1 having one surface and two surface processing modes.

9. A sheet supply device as claimed in claim 8, wherein said one surface processing mode and two surface processing mode are set by a signal inputted from an outside.

10. A sheet supply device as claimed in claim 1, wherein sheets are controlled such that when the first supply of the next sheet arrives at the sheet process portion, the preceding sheet is located in the switch-back pass between the second and third supplies.

11. A sheet supply device as claimed in claim 1, wherein said sheet supply stacker and said switch-back path are located above the sheet ejecting stacker.

12. A sheet supply device as claimed in claim 11, wherein said sheet supply stacker, switch-back path and sheet ejecting stacker are substantially vertically arranged.

13. A sheet processing method comprising:

a first supply step for supplying a first sheet to a sheet process portion through a supply path and entering the first sheet to a switch-back path to change a moving direction of the first sheet so that a rear side of the first sheet when entering the switch-back path through the supply path is changed to a front side when leaving the switch-back path and entering again to the supply path to become a reversed state, a second supply step for supplying the first sheet subjected to said first supply in the reversed state to the sheet process portion through the supply path at an upstream side of the sheet process portion and entering the first sheet to the switch-back path to change the moving direction again, a third supply step for supplying a second sheet to the sheet process portion through the supply path after the second supply step, and a fourth supply step for re-supplying the first sheet in the switch-back path to the sheet process portion through the supply path after the third supply step of the second sheet.

14. A sheet processing method as claimed in claim 13, wherein a sheet processing at the sheet process portion is carried out when the first and second supply steps of the first sheet and the third supply step for the second sheet are made, and the sheet processing is not carried out in the fourth supply step for the first sheet.

15. A sheet processing method as claimed in claim 13, wherein a sheet processing at the sheet process portion is not carried out in the first supply step of the first sheet; the sheet processing at the sheet processing portion is carried out when the second and fourth supply steps of the first sheet are made, and the sheet processing at the sheet processing portion is not carried out in the third supply of the second sheet.

* * * * *